F. & N. M. SPRANG R.
WHEEL HUB.
APPLICATION FILED DEC. 1, 1913.
1,116,510.                        Patented Nov. 10, 1914.
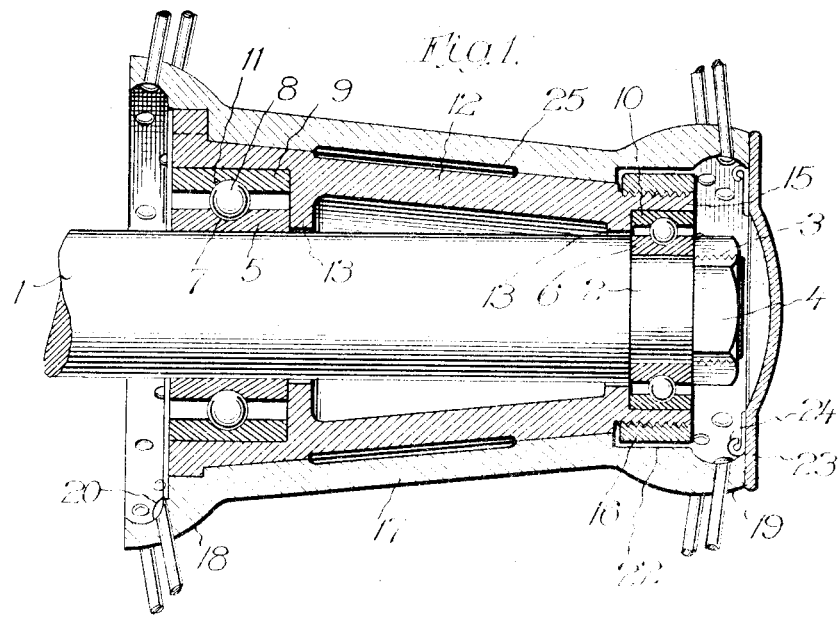
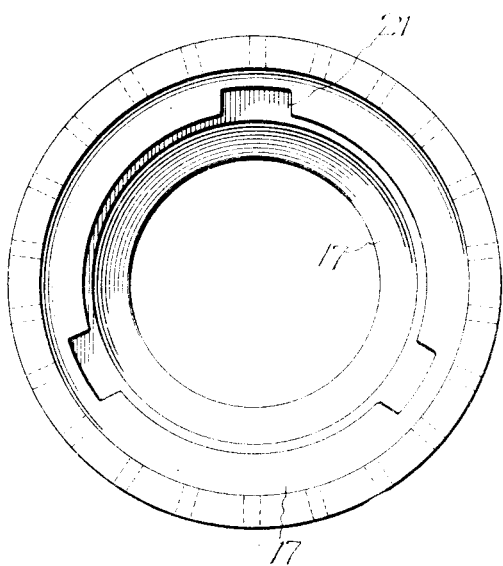
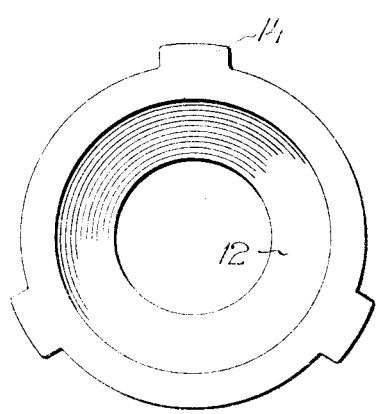
Witnesses
Inventors
Frank Spranger
Nicholas M. Spranger
By
Attorneys

UNITED STATES PATENT OFFICE.

FRANK SPRANGER AND NICHOLAS M. SPRANGER, OF DETROIT, MICHIGAN.

WHEEL-HUB.

1,116,510. Specification of Letters Patent. Patented Nov. 10, 1914.

Application filed December 1, 1913. Serial No. 803,897.

*To all whom it may concern:*

Be it known that we, FRANK SPRANGER and NICHOLAS M. SPRANGER, citizens of the United States of America, residing at Detroit, in the county of Wayne and State of Michigan, have invented certain new and useful Improvements in Wheel-Hubs, of which the following is a specification, reference being had therein to the accompanying drawings.

This invention relates to a demountable hub for wire automobile wheels, and the objects of our invention are to provide an antifrictional hub that is mounted upon an axle in a manner, as hereinafter set forth, that permits of a wheel being removed from the axle without disassembling the anti-frictional bearings thereof, and to provide a wheel hub that is positively locked relatively to the axle bearing support thereof.

The above and other objects are attained by a strong and durable mechanical construction consisting of comparatively few parts that are easy to assemble and highly efficient for automobile wheels.

The invention will be hereinafter specifically described and then claimed, and reference will now be had to the drawing, wherein there is illustrated a preferred embodiment of my invention, but it is to be understood that the structural elements are susceptible to such changes, as in the size, shape and manner of assemblage as fall within the scope of the appended claims.

In the drawing, Figure 1 is a longitudinal sectional view of the hub; Fig. 2 is a view of the inner end thereof with the bearing sleeve removed, and Fig. 3 is an end view of a detached bearing sleeve;

In the drawing, 1 denotes an axle or spindle having a reduced end 2 provided with screw threads 3 for a nut 4. Shrunk or otherwise mounted upon the axle 1 are inner bearing collars 5 and 6, the collar 6 being arranged upon the reduced end 2 of the axle and of less length than the collar 5. The bearing collars 5 and 6 have the peripheries thereof provided with annular ball races 7 for anti-friction balls 8 that are arranged circumferentially of the collars 5 and 6. The balls 8 are retained in engagement with the collars 5 and 6 by outer collars 9 and 10 having ball races 11. Any suitable means can be resorted to for placing the anti-friction balls between the collars, for instance through openings formed in the outer collars and plugged after the balls are placed therein.

Surrounding the end of the axle is a tapering sleeve 12 that tapers from the inner end thereof to the outer end. The sleeve 12, adjacent to the ends thereof, has annular interior flanges 13, one of said flanges providing a seat for the collars 5 and 9 and the other flange providing a seat for the collar 10. The pairs of collars retain the sleeve 12 out of engagement with the axle 1, and the inner end of the sleeve is provided with radially disposed equally spaced lugs, the purpose of which will hereinafter appear. The outer end of the sleeve 12 terminates in an exteriorly screw-threaded cylindrical portion 15 accommodating the nut 16 that can be placed thereon by the aid of a spanner wrench or suitable tool.

Mounted upon the sleeve 12 is a tapering hub member 17 having bell or crown ends 18 and 19. These ends of the hub member are provided with openings for the inner ends of wire spokes 20, which have the ends thereof up-set or riveted within the ends of said member. The crown end 18 of the hub member is provided with equally spaced radially disposed recesses 21 to receive the lugs 14 of the sleeve 12.

The crown end 19 of the hub member 17 is cut-away to provide an annular recess 22 which provides clearance for the nut 16 employed to retain the hub member 17 upon the bearing sleeve 12. A cap 23 is detachably mounted upon the outer end of the hub member and is retained in engagement therewith by resilient clips 24 or any suitable fastening means.

To reduce the weight of the bearing sleeve 12 and the hub member 17, these two elements have the confronting sides thereof, intermediate the ends, provided with annular grooves 25, said grooves also saving considerable machining when fitting the parts.

To demount the wheel, it is only necessary to remove the cap 23, the nut 16 and then slide the hub member 17 off of the bearing sleeve 12. The anti-frictional bearings remain intact and it is an extremely easy matter to substitute another wheel for the one removed. The lugs 14 and the nut 16 coöperate in preventing longitudinal displacement of the hub member 17 relatively to the sleeve 12 and the lugs 14 insure rotative continuity between the hub member 17 and the bearing sleeve.

What we claim is:—

In a demountable hub for wheels, the combination with a bearing sleeve of radially disposed lugs carried by the inner end of said sleeve, a tapering hub member detachably mounted upon said sleeve and having an inner crowned end adapted to be attached to spokes, the said crowned end of said member having recesses formed therein to receive the lugs of said sleeve, said hub member having an outer crowned end adapted to be connected to spokes, and means mounted upon the outer end of said sleeve and inclosed by the outer crowned end of said hub member and adapted to coöperate with said lugs in preventing longitudinal displacement of said hub member relative to said sleeve.

In testimony whereof we affix our signatures in presence of two witnesses.

FRANK SPRANGER.
NICHOLAS M. SPRANGER.

Witnesses:
  OTTO F. SMITH,
  ANNA M. DORR.